2,809,178

OIL SOLUBLE PHENOL-FORMALDEHYDE RESIN

John Harry Wallice Turner, Eastgate, Cowbridge, and Leonard Ralph Anthony and Peter Lionel Bramwyche, Penarth, Wales, assignors to The Distillers Company Limited, Edinburgh, Scotland, a British company No Drawing. Application March 15, 1954, Serial No. 416,392

Claims priority, application Great Britain March 26, 1953

13 Claims. (Cl. 260—19)

The present invention relates to a process for the production of a novel class of oil-soluble synthetic resins, in particular the production of oil-soluble unmodified phenolic resins possessing a high but readily controllable degree of oil-reactivity. By the expression "oil-soluble" is meant that the resin can be dispersed or dissolved in a vegetable oil to give a clear, stable solution which is capable of being thinned with a hydrocarbon solvent. By "oil-reactive" is meant that the resin, when dissolved or dispersed in a vegetable oil, has the effect of promoting the rate of bodying or gelation of the oil. This effect is most marked with oils possessing a high degree of conjugated unsaturation such as china wood or tung oil and oiticica oil. The invention further relates to the resinous products obtained by the reaction of the oil-soluble synthetic resins with vegetable oils.

Various processes have been suggested for the production of oil-soluble phenol-aldehyde condensation products. For instance, the condensation reaction of the phenol and the aldehyde may be carried out in the presence of the vegetable oil so that a homogeneous solution is produced, or, alternatively, an unmodified phenol-aldehyde resin is reacted with rosin or other natural resin until a modified resin is produced which is oil-soluble. Unmodified phenol-aldehyde condensation products which are soluble in oils may be prepared from substituted phenols particularly those with a hydrocarbon substituent in the para-position to the hydroxyl group, for instance para-tertiary-butyl phenol and para-phenyl phenol. These unmodified oil-soluble phenol-aldehyde resins fall into two broad classes; those which are thermoplastic and are not oil-reactive and those which are heat hardenable i. e. of the resole type, and which are generally regarded as being oil-reactive.

The object of the present invention is to provide a process for the production of oil-soluble phenol-aldehyde resins which are substantially thermoplastic and which may have a high degree of oil-reactivity. Another object of the present invention is to provide compositions comprising an oil-soluble phenol-aldehyde resin and a vegetable oil preferably containing conjugated unsaturation which can be stabilised at any desired stage of the reaction between the resin and the oil. Yet another object of the invention is to provide a process for the rapid and convenient production of uniform compositions comprising a phenol-aldehyde resin and an unsaturated vegetable oil.

According to the present invention the process for the production of an oil-soluble phenol-aldehyde resin comprises condensing a monohydric phenol with an aldehyde in the presence of an acid catalyst to produce a resin reaction mixture substantially free from aldehyde, dehydrating the resin reaction mixture and heating the substantially dehydrated resin reaction mixture in the presence therein of a Friedel-Crafts halide catalyst, as hereinafter defined, and some free monohydric phenol to an elevated temperature.

By monohydric phenol is meant throughout this specification phenol or an alkyl- or aryl-substituted derivative thereof having at least one unsubstituted hydrogen atom in the positions ortho or para to the phenolic hydroxy group. If phenol is employed in the first stage of the process of the present invention to produce a resin reaction mixture it is essential that the monohydric phenol used in the final etherification step of the process should be an alkyl- or aryl-substituted phenol. Examples of alkyl- and aryl-substituted phenols include the cresols, the xylenols and para-substituted phenols such as p. tertiary butyl phenol, p. tertiary amyl phenol, p. tertiary octyl phenol and p. phenyl phenol. Of these phenols the cresols and xylenols are particularly suitable for the process of the present invention. The process is often most suitably carried out on mixtures of monohydric phenols.

The aldehyde used in the process of the present invention may suitably be any aliphatic aldehyde containing up to 4 carbon atoms in the molecule such as formaldehyde, acetaldehyde and butyraldehyde and such aldehydes may be used in the form of their polymers which release the monomeric aldehyde under the conditions of the condensation reaction. The preferred aldehyde is formaldehyde.

The relative proportions of monohydric phenol to aldehyde used in the process of the present invention may be varied considerably without affecting the thermoplastic characteristics or the oil-reactivity of the produced resin. The chief effect of variations in the phenol:aldehyde ratio is to change the melting point of the resultant oil-soluble resin. In general: it is preferred that for each mole of monohydric phenol present in the initial reaction mixture from 0.6 to 1.6 moles of aldehyde should be employed.

The acid catalyst employed in the condensation step of the process of the present invention may be any acid of the type which has hitherto been employed in the production of novolak resin by the interaction of phenols and aldehydes. The concentration of acid catalyst is most suitably the same as that which has been employed in the production of novolak resins and this amount varies with the catalytic power of the particular acid catalyst employed. For instance the preferred quantities of acid catalyst such as hydrochloric acid, sulphuric acid and oxalic acid are 0.15%, 0.5% and 1% respectively by weight on the reaction mixture. Another suitable acid catalyst is phosphoric acid.

The condensation of the monohydric phenol with the aldehyde according to the first stage of the process of the present invention may be brought about by heating the reaction mixture containing the phenol, the aldehyde and the acid catalyst until substantially all the aldehyde has been consumed and the heating may be continued at this stage until a product of suitable degree of condensation has been obtained. As in the final stage of the process of the present invention the substantially dehydrated phenol-formaldehyde resin reaction mixture is heated in the presence therein of a Friedel Crafts halide catalyst and some free monohydric phenol, it is preferred that the initial condensation reaction should not be continued to such an extent that all the free monohydric phenol is consumed and thus the substantially dehydrated reaction mixture produced therefrom will contain sufficient free monohydric phenol for the final stage of the process of the present invention to be carried out directly thereon. This procedure can only be adopted when the monohydric phenol used in the condensation step does not consist entirely of phenol ($C_6H_5OH$).

However if the first stage of the reaction has been carried to such a point that the free monohydric phenol content of the resin reaction mixture has been reduced to too low a value (below about 5%), a suitable monohydric phenol should be added to the reaction mixture either before or after the dehydration step of the process of the present invention so that the substantially dehydrated resin reaction mixture contains some free monohydric phenol and may be heated according to the last stage of the process after the addition thereto of a Friedel Crafts halide catalyst. While the monohydric phenol added in this way will usually be that which was employed for reaction with the aldehyde it is within the scope of the present invention for a different monohydric phenol to be employed.

To obtain optimum results the quantity of free monohydric phenol present in the substantially dehydrated liquid resin reaction mixture should be within the range 30% to 10% by weight of the total monohydric phenol employed in the process, but the preferred value will depend on the monohydric phenol employed in the etherification step and on the monohydric phenol and the aldehyde employed in the condensation step and on their relative proportions. When the monohydric phenol employed is a commercial xylenol fraction and the aldehyde is formaldehyde which is present in the proportion of 0.6 to 1.6 moles to each mole of xylenol, it is preferred that the resin reaction mixture resulting from the first stage of the process should contain about 15 to 20% free xylenol.

The monohydric phenol content of the resin reaction mixture produced in the first stage of the process of the present invention may be determined by any suitable means. For instance the free monohydric phenol may be extracted from a test portion of the reaction mixture either by a solvent extraction process or, in some cases, by a steam distillation process and the amount of phenol thus removed determined analytically. From the figure thus obtained the free monohydric phenol content of the liquid resin reaction mixture may be calculated.

The temperature at which the condensation reaction of the first stage of the process of the present invention is brought about may be varied considerably and the reaction may be carried out under any conditions of temperature which have heretofore been employed in the production of novolak resins. In practice, particularly when an aqueous solution of the aldehyde, e. g. formalin, is employed, the reaction mixture contains water and most suitably the reaction is carried out at approximately 100° C. under reflux conditions.

The dehydration step of the process of the present invention may be carried out by heating the resin reaction mixture produced by the condensation reaction to an elevated temperature until substantially all the water initially present in the reaction mixture is distilled therefrom. The rate of removal of the water may be increased by carrying out the dehydration under reduced pressure and when this is done the dehydration may be carried out at a lower temperature. The dehydration of the resin reaction mixture may also be carried out azeotropically by the addition of a suitable solvent for the resin to the mixture, distilling off a mixture of solvent and water, separating the water and returning the solvent to the batch and continuing this process until substantially all the water is removed.

The final stage in the process of the present invention comprises heating the substantially dehydrated resin reaction mixture to an elevated temperature in the presence therein of a Friedel Crafts halide catalyst and some free phenol. The temperature is preferably in excess of 100° C. There is no critical upper limit to the temperature to which the resin reaction mixture may be heated, but it is important not to use such a high temperature that the resin reaction mixture is charred. By Friedel Crafts halide catalyst is meant throughout this specification those compounds, containing at least one halogen atom, known to be capable of bringing about the Friedel Crafts reaction. Examples of such compounds are boron trifluoride, hydrogen fluoride, aluminum chloride, stannic chloride and fluorosulphonic acid.

During this final step of the process there is a marked drop in the viscosity and change in colour of the resin reaction mixture and at the same time the free monohydric phenol content of the mixture drops to substantially zero. It is believed that the reaction taking place during this step is one in which etherification of the resin with the free monohydric phenol occurs under the influence of the Friedel Crafts halide catalyst and the substantially anhydrous conditions.

The quantity of Friedel Crafts halide catalyst present in the reaction mixture in the final stage of the process of the present invention may be varied considerably according to the temperature to which the mixture is heated and the nature of the catalyst employed. Generally satisfactory results are obtained if the quantity of catalyst present is in the range 0.05–1.5% by weight of the substantially dehydrated resin reaction mixture containing the free monohydric phenol.

The Friedel Crafts catalyst is added to the resin reaction mixture after the dehydration step has been substantially completed.

The etherification step is most suitably carried out by heating the reaction mixture in the presence of an inert solvent whose boiling point is such that the reaction may be carried out under reflux of this solvent. Preferably the solvent is the same solvent as used in the dehydration step and thus the dehydration step and the etherification reaction may be carried out consecutively in the same reaction vessel. By selecting a suitable solvent and adjusting the quantity taken it is possible to arrange for any desired batch temperature to be attained after all the water has been removed. After the bulk of the water has been removed therefrom and after the addition of the Friedel Crafts halide catalyst, the solution may be held under reflux to effect the etherification reaction and finally the solvent and any residual water removed by distillation under vaccum. The most convenient liquid to use as a solvent entraining liquid is xylol but this solvent is not so suitable when the monohydric phenol used in the condensation step of the process is phenol ($C_6H_5OH$) because the condensation products so produced are often insoluble therein. Other liquids which are water immiscible, are solvents for the resin and possess suitable boiling points may be used. It is, however, essential that they are free from hydroxyl or any other groups which could react either among themselves or enter into reaction with the resin. For example there is evidence that the employment of hydrophilic solvents destroys the oil-reactivity of the resin.

The phenol-aldehyde resins produced according to the process of the present invention are all oil-soluble and may show a marked oil-reactivity with highly conjugated oils such as tung and oiticica oils.

The oil-soluble phenol-aldehyde resins may be modified by reaction with unsaturated hydrocarbons such as styrene, coumarone or indene to produce further oil-soluble and oil-reactive products. This reaction may be carried out by heating the resin with the unsaturated hydrocarbon to an elevated temperature in the presence of an acid catalyst.

It has been found that the oil-reactivity can be destroyed by neutralisation of the resin with a base. This can take place prior to addition of the oil or at any stage after this addition prior to gelation of the mix. Suitable bases include sodium hydroxide, triethanolamine, morpholine, or hexamine or metallic oxides like zinc oxide, calcium oxide or litharge.

It has further been found that the gelation of the resin-oil mixtures may be prevented or considerably retarded by the addition thereto of hydroxyl-containing solvents such as alcohols and accordingly stable solutions can be prepared by the addition of such hydroxyl-containing solvents to the resin-oil mixture.

The products obtained by reaction of the oil-soluble resins of the present invention with conjugated oils possess exceptional resistance to water and alkalies. They can be thinned with hydrocarbon solvents and used in the production of surface coating compositions or insulating varnishes. There is a tendency for the resin-oil composition to have rather poor solubility in aliphatic hydrocarbons, and hence require the addition of some aromatic solvents, but for a number of applications this disadvantage is off-set by the superior solvent resistance of the cured films. Low viscosity resin-oil compositions can be employed as solventless impregnating varnishes and potting compounds when their ability to form strong tough gels of considerable thickness without evolution of volatile products is particularly valuable. The resin-oil composition can also be employed in the manufacture of floor coverings, linoleum and the like, or it can be emulsified in water and used as an adhesive, for example in the manufacture of sand-cores, brake linings and the like. For these purposes it may be convenient to add the conjugated oil to the resin solution produced after the etherification step has been completed in the presence of a suitable solvent entraining agent, carry out the resin-oil reaction in solution, then emulsify this solution in water and finally distil the solvent off from the emulsion.

It may also be convenient to add the conjugated oil directly to the resin solution, react this mixture until the required degree of bodying has taken place and then cool or distil off all or part of the solvent as required. In these cases it will usually be found desirable to add sufficient base to neutralise the acidity and stop the reaction at the desired stage. This procedure is particularly convenient when the resin is only soluble in the oil with difficulty, and the solvent functions as a common solvent for the resin and oil. Even under these conditions the resin may be oil-reactive and this is shown by a rapid increase in viscosity and by the fact that the resin and oil will not separate out after bodying.

For some applications it may be desirable to replace all or some of the conjugated drying oils by the lower alcohol esters of the drying oil fatty acids.

The following examples illustrate specific methods of carrying out the process of the present invention, the parts referred to being by weight:

*Example 1*

A novolak resin containing approximately 15% free cresols, is prepared from a commercial quality cresylic acid containing 52% meta-cresol by mixing 100 parts of the cresylic acid with 80 parts of 40% formalin and 0.6 part of oxalic acid and heating the mixture under reflux for 90 minutes. It is then dehydrated by distillation up to a temperature of 125° C. under vacuum. 0.2% of boron trifluoride/phenol complex (25% boron trifluoride) is then added and the reaction mixture held at 125–130° C. for ½ hour to produce an oil-soluble resin of melting point 90° C. (ball and ring).

*Example 2*

400 parts of a cresol novolak resin prepared as described in Example 1 are dissolved in 170 parts to xylol and traces of water removed by azeotropic distillation. The temperature is then adjusted to 110° C. and a solution of 8 parts of aluminium chloride in 40 parts of diethyl benzene added. The mixture is heated under reflux until the reaction is complete, and the solvent then removed by distillation under vacuum up to a temperature of 145° C., leaving a dark coloured resin which is soluble in raw wood oil.

Essentially similar resins are obtained by replacing the cresylic acid employed in Examples 1 and 2 with equivalent quantities of xylenol mixtures.

*Example 3*

100 parts of cresylic acid containing 52% m-cresol, 80 parts of commercial 40% formalin, 0.6 part of oxalic acid dissolved in 1 part of water are charged into a flask and heated under reflux for 80–90 minutes after which the resin is dehydrated by heating under vacuum to 125° C. to produce a hard, brittle resin. 400 parts of this novolak are dissolved in 171 parts of xylol and the temperature adjusted to 100° C. 8 parts of fluorosulphonic acid are added and the temperature raised to reflux, and held for 6 hours, at the end of which time the reaction appeared to be complete. The solvent is then removed by distillation under vacuum, leaving a hard, resinous product which is soluble in raw wood oil.

*Example 4*

400 parts of the cresol novolak prepared as described in Example 3 are dissolved in 189 parts of xylol, and 40 parts of p-octyl phenol are added. The temperature is adjusted to 80° C. and 4 parts of fluorosulphonic acid are added. An exothermic reaction takes place and the temperature rises rapidly to reflux. When the reaction slackens, external heat is applied to maintain the solution under reflux for 4 hours after which time the solvent is removed under vacuum. The product is a hard resin dark in colour which is soluble in raw wood oil.

Essentially similar products are obtained by replacing the p-octyl phenol employed above with an equivalent quantity of p-tertiary butyl phenol, p-tertiary amyl phenol or p-phenyl phenol.

*Example 5*

200 parts of the cresol novolak as used in Example 1 are dissolved in 94 parts of xylol, 20 parts of para octyl phenol and 2 ccs. of a boron trifluoride acetic acid complex are added at 96° C. The mixture is then heated to 125° C. in order to remove traces of water, chilled back to 90° C. and then slowly raised to 139° C. at which temperature the solution starts to reflux, and the water of reaction is removed by means of a Dean & Stark pattern trap. The solution is held for 3 hours at 139–140° C. when 330 parts of raw wood oil, preheated to 110° C., are added and the mixture is bodied at 126–130° C. for 45 minutes. The resulting composition is allowed to cool and driers equivalent to 0.25% Pb, 0.06% Co and 0.1% Ca on the oil are added in the form of naphthenates. The resulting varnish gives satisfactory varnish coating with good solvent resistance.

We claim:

1. A process for the production of a thermoplastic oil-soluble phenol-aldehyde resin which comprises condensing one molecular proportion of a mononuclear, monohydric phenol with 0.6 to 1.6 molecular proportions of a saturated aliphatic aldehyde having not more than four carbon atoms in the molecule in the presence of an acid catalyst to produce a resin reaction mixture free from aldehyde, dehydrating the resin reaction mixture and heating the dehydrated resin reaction mixture to a temperature in excess of 100° C. in the presence therein of a Friedel Crafts halide catalyst and at least 5% by weight thereof of a free mononuclear monohydric phenol, the last-named monohydric phenol being other than $C_6H_5OH$ when the first-named monohydric phenol is $C_6H_5OH$.

2. An oil-soluble phenol-aldehyde resin obtained by condensing one molecular proportion of a mononuclear, monohydric phenol with 0.6 to 1.6 molecular proportions of a saturated aliphatic aldehyde having not more than four carbon atoms in the molecule in the presence of an acid catalyst to produce a resin reaction mixture free from aldehyde, dehydrating the resin reaction mixture and heating the dehydrated resin reaction mixture to a temperature in excess of 100° C. in the presence therein of a Friedel Crafts halide catalyst and at least 5% by weight thereof of a free mononuclear monohydric phenol, the last-named monohydric phenol being other than $C_6H_5OH$ when the first-named monohydric phenol is $C_6H_5OH$.

3. A process for the production of a resinous product which comprises heating with a vegetable oil possessing conjugated unsaturation, an oil soluble phenol-aldehyde resin obtained by condensing one molecular proportion of a mononuclear, monohydric phenol with 0.6 to 1.6 molecular proportions of a saturated aliphatic aldehyde having not more than four carbon atoms in the molecule in the presence of an acid catalyst to produce a resin reaction mixture free from aldehyde, dehydrating the resin reaction mixture and heating the dehydrated resin reaction mixture to a temperature in excess of 100° C. in the presence therein of a Friedel Crafts halide catalyst and at least 5% by weight thereof of a free mononuclear monohydric phenol, the last-named monohydric phenol being other than $C_6H_5OH$ when the first-named monohydric phenol is $C_6H_5OH$.

4. A process as claimed in claim 1, wherein the acid catalyst employed in the condensation reaction is selected from the group consisting of hydrochloric acid, sulphuric acid, oxalic acid and phosphoric acid.

5. A process as claimed in claim 1, wherein the quantity of free monohydric phenol in the dehydrated resin reaction mixture is in the range 30% to 10% by weight of the total monohydric phenol employed in the process.

6. A process as claimed in claim 1, wherein the resin reaction mixture is dehydrated to give a dehydrated resin reaction mixture containing free phenol.

7. A process as claimed in claim 1, wherein a monohydric phenol is added to the resin reaction mixture after the completion of the initial condensation reaction.

8. A process as claimed in claim 1, wherein the aldehyde employed is formaldehyde in aqueous solution and the condensation reaction is carried out at approximately 100° C. under reflux conditions.

9. A process as claimed in claim 1, wherein the dehydration of the resin is carried out azeotropically in a solvent whose boiling point is such that the final heating step may be carried out under reflux of this solvent.

10. A process as claimed in claim 1, wherein the heating step is continued until there is a drop in the viscosity value of the resin reaction mixture to a minimum value.

11. A process as claimed in claim 1, wherein the quantity of Friedel Crafts halide catalyst present is in the range 0.05 to 1.5% by weight on the dehydrated resin reaction mixture containing the free monohydric phenol.

12. A process as claimed in claim 1, wherein the Friedel Crafts halide catalyst is selected from the group consisting of boron trifluoride, aluminium chloride and fluorosulphonic acid.

13. A process as claimed in claim 3, wherein the vegetable oil is selected from the group consisting of tung oil and oiticica oil.

References Cited in the file of this patent

UNITED STATES PATENTS

| | | |
|---|---|---|
| 2,364,192 | Charlton et al. | Dec. 5, 1944 |
| 2,375,964 | Turkington et al. | May 15, 1945 |
| 2,413,412 | Mazzucchelli | Dec. 31, 1946 |